United States Patent [19]

Riviere

[11] Patent Number: 5,151,957
[45] Date of Patent: Sep. 29, 1992

[54] POLARIZATION BEAM SPLITTER FOR GUIDED LIGHT

[75] Inventor: Luc Riviere, Valbonne, France

[73] Assignee: France Telecom Etablissement Autonome de Droit Public (Centre National d'Etudes des Telecommunications), Issy les Moulineaux, France

[21] Appl. No.: 780,908

[22] Filed: Oct. 23, 1991

[30] Foreign Application Priority Data

Oct. 31, 1990 [FR] France .................. 90 13529

[51] Int. Cl.$^5$ .................................. G02B 6/10
[52] U.S. Cl. .................................. 385/41; 385/14; 385/11; 385/132
[58] Field of Search .................. 385/9, 11, 14, 40, 41, 385/129, 130, 132; 359/483, 484

[56] References Cited

U.S. PATENT DOCUMENTS

| | | | |
|---|---|---|---|
| 4,157,860 | 6/1979 | Marcatili | 385/9 |
| 4,243,295 | 1/1981 | Alferness | 385/9 |
| 4,390,236 | 6/1983 | Alferness | 385/41 |
| 4,391,486 | 7/1983 | Papuchon et al. | 385/11 |
| 4,669,815 | 6/1987 | Thaniyavarn | 385/11 |
| 4,674,829 | 6/1987 | Bulmer et al. | 385/41 |
| 4,697,868 | 10/1987 | Thaniyavarn | 385/11 |
| 4,711,515 | 12/1987 | Alferness | 385/41 |
| 4,772,084 | 9/1988 | Bogert | 385/11 |
| 4,820,009 | 4/1989 | Thaniyavarn | 385/45 X |
| 4,865,408 | 9/1989 | Korotky | 385/41 |
| 5,004,314 | 4/1991 | Booth et al. | 385/40 X |
| 5,016,958 | 5/1991 | Booth | 385/45 |
| 5,066,086 | 11/1991 | Angenent et al. | 385/41 |
| 5,103,491 | 4/1992 | Kuzuta | 385/9 |

FOREIGN PATENT DOCUMENTS

| | | | |
|---|---|---|---|
| 0361152 | 9/1989 | European Pat. Off. | 385/41 |
| 2633060 | 12/1989 | France | 385/45 |
| 5737328 | 6/1982 | Japan | 385/41 |
| 1246529 | 10/1989 | Japan | 385/41 |
| 2179465 | 3/1987 | United Kingdom | 385/41 |

OTHER PUBLICATIONS

Electronics Letters, vol. 23, No. 21, pp. 1145-1147, (H. Okayama et al., Oct. 8, 1987).
Electronics Letters, vol. 23, No. 12, pp. 614-616 (K. Habara, Jun. 4, 1987).
Electronics Letters, vol. 24, No. 9, pp. 530-531, (T. Pohlman, Apr. 28, 1988).
Applied Physics Letters, No. 10, New York, N.Y. (J. L. Nightingale, et al., Sep. 7, 1987) pp. 716-718.
Electronics Letters, vol. 24, No. 8, pp. 478-479, (S. P. Shipley, Apr. 14, 1988).
Journal of Optical Communications, vol. 5, No. 4, pp. 122-131, (H. F. Schlaak, Dec., 1984).

*Primary Examiner*—Brian Healy
*Attorney, Agent, or Firm*—Pearne, Gordon, McCoy & Granger

[57] ABSTRACT

This e.g. Z-propagating, X-cut LiNbO$_3$:Ti splitter comprises an alternating delta beta directional coupler (39) able to introduce, in the absence of a voltage between its electrodes, a delta beta variation between its propagation constants, which is (a) independent of the polarization state of the guided lightwave and (b) such that the representative point of the coupler on its control diagram is the center of a segment parallel to the abscissa axis of the reference frame in which the diagram is plotted, and defined by two curves respectively corresponding to parallel states and crossed states of the coupler. Application to integrated optics.

8 Claims, 4 Drawing Sheets

POLARIZATION BEAM SPLITTER FOR GUIDED LIGHT

BACKGROUND OF THE INVENTION

The present invention relates to a polarization beam splitter for guided light. It is used in integrated optics, e.g. in the field of optical fibre sensors or in the field of coherent information transmission by monamode optical fibres, in which the polarization state of the optical waves used is a very important perameter.

In these fields, polarization beam splitters are essential devices permitting the spatial splitting of transverse-electric modes (TE) and transverse-magnetic modes (TM) of the optical waves used.

Various guided light polarization splitters are already known, which are produced on electrooptical uniaxial materials and in particular LiNbO$_3$:Ti.

On the latter material, whose crystal axes are conventionally designated X, Y and Z, the X and Y axes both correspond to the ordinary refractive index of the material, whilst the Z axis corresponds to the extraordinary refractive index thereof, production has taken place of: directional couplers in propagation configurations along the X axis or Y axis (cf. document (1) which, like the other citations, is referred to at the end of the description), devices using bimodal interference methods (cf. document (2)), structures with Y-junctions (cf. document (3)), and splitters having exchanged ion waveguide parts (cf. document (4)).

Document (5) discloses a directional coupler with alternating delta beta electrode structure produced on a birefringent cut lithium niobate substrate and which can be used as a polarization splitter.

Figure 1:
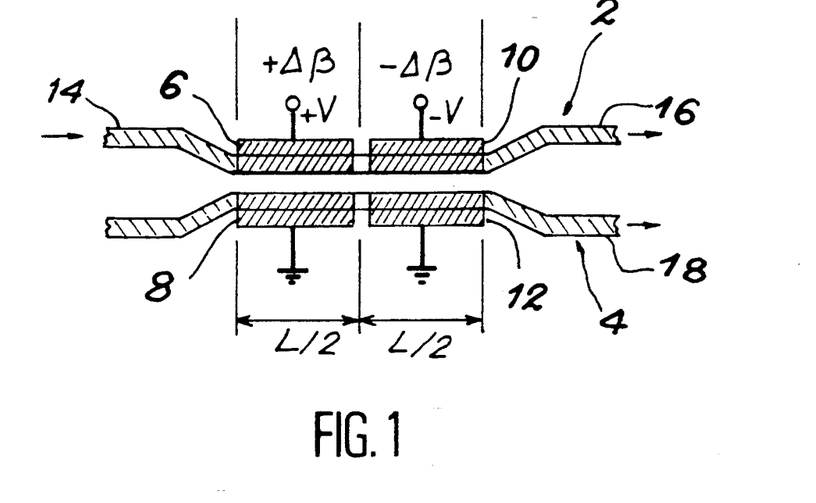
FIG. 1: A diagrammatic view of a known polarization splitter, which uses an alternating delta beta directional coupler and which has already been described.

This directional coupler, diagrammatically shown in FIG. 1, comprises two light guides 2, 4 of constant width and two sections adjacent to one another having a length L/2, in which L represents the interaction length of the coupler. The light guide 2 (respectively 4) is provided with a control electrode 6 (respectively 8) in one of the two sections and a control electrode 10 (respectively 12) in the other section.

Figure 2:
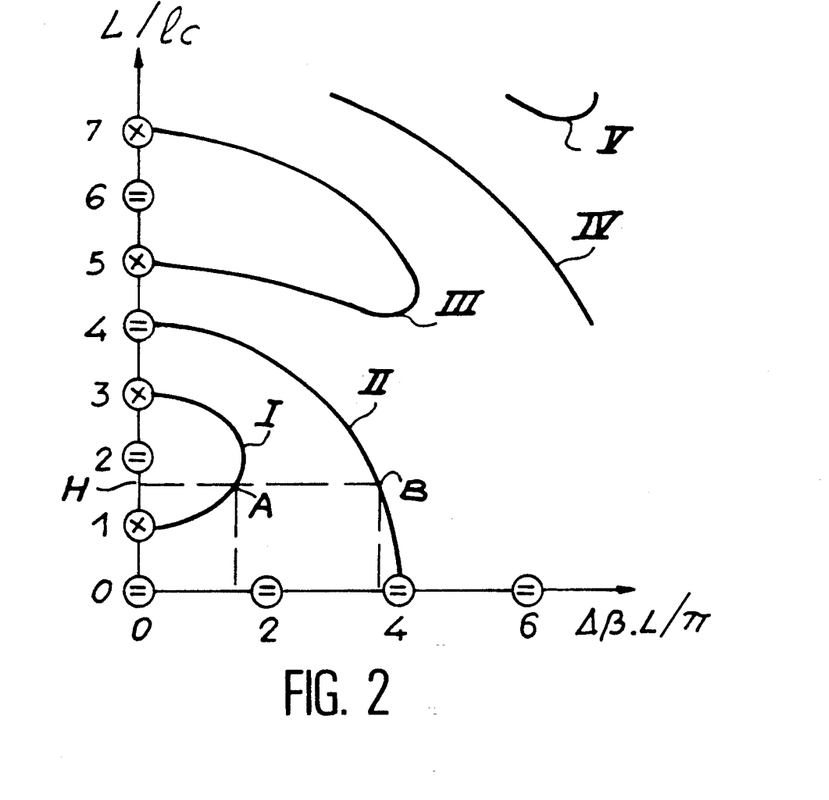
FIG. 2: Part of the control diagram of this coupler which has already been described.

The control diagram of the coupler of FIG. 1 is partly shown in FIG. 2.

It is pointed out that a control diagram of a directional coupler is plotted in a reference frame, on whose abscissa axis is placed the parameter delta beta.L/pi in which pi is the well known number with a value of approximately 3.1416, L is the interaction length of the coupler and delta beta (designated with the usual Greek letters in the drawings) is the difference between the propagation constants respectively associated with the symmetrical and antisymmetrical propagation modes of the coupler.

On the ordinate axis of the reference frame, is placed the quantity L/lc, in which lc represents the coupling length of the coupler.

The control diagram of FIG. 2 constitutes a plurality of curves admitting the ordinate axis as the axis of symmetry. Curves I, III and V correspond to the crossed states of the coupler, designated by the symbol x on the axes of the reference frame. The curves II and IV (semicircles) correspond to the parallel states of the coupler, which are designated by the symbol = on the axes of the reference frame.

Examination of the matrix of electrooptical coefficients $r_{ij}$ of the lithium niobate shows that, for a given electrical field applied in the direction of the crystal axis Y and a transverse wave propagating parallel to the axis X, the delta beta phase displacements induced by the electrooptical effect on the fundamental transverse-electric (TE) and transverse-magnet (TM) modes are in a ratio close to 3.

Thus, on considering the coupler of FIG. 1 produced on an alternating delta beta structure on a lithium niobate substrate, whose surface is perpendicular to the crystal axis Y, the guided wave propagates parallel to the axis X, H being the representative point of the coupler in the absence of a field applied (cf. FIG. 2).

This point H is located on the ordinate axis of the control diagram (delta beta=0). If an electrical field parallel to the axis Y is applied, the coupler admits two representative points A and B, respectively relating to the guided modes TE and TM.

From the statement made hereinbefore is taken:

$HB = 3HA$

If the point H and the value of the field applied are chosen such that the point A forms part of the curve I and the point B forms part of the curve II, respectively linked with the crossed and parallel states of the coupler, a splitting will be obtained of the polarized waves TE and TM. As the optical wave is injected at the output 14 of the guide 2 (FIG. 1), the polarized wave TM will be obtained at the end 16 of said guide 2 and the polarized wave TE will be obtained at the end 18 of the guide 4 (located at the side of the end 16).

This leads to two important disadvantages: correct operation requires a very precise choice of the point H and therefore the ratio L/lc of the coupler, the constructional tolerances being very narrow; the reasoning given hereinbefore implicitly presupposes that the curves I, II, . . . , V of the control diagram are the same for the TE and TM polarizations, which is not generally the case, the coupling lengths lc being different for the guided waves TE and TM.

Figure 3:
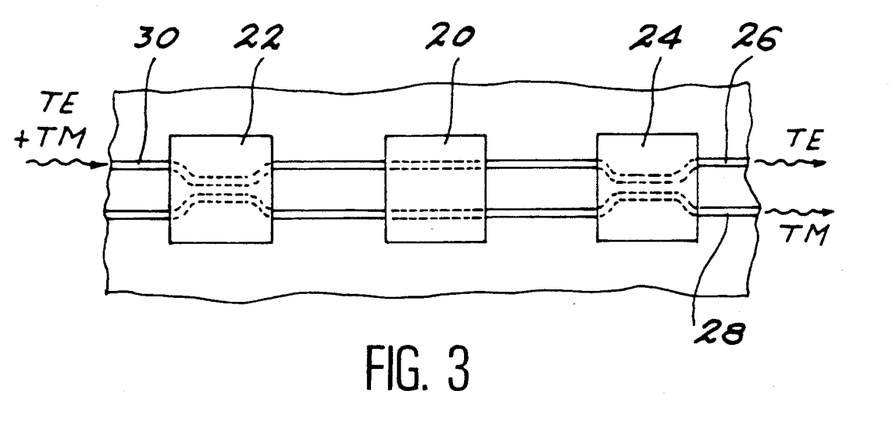
FIG. 3: A diagrammatic view of another known and already described polarization splitter.

Document (6) discloses a polarization splitter diagrammatically shown in FIG. 3. This splitter comprises a phase shifter 20, which interconnects two 3dB directional couplers 22, 24. By appropriately polarizing this known splitter, it is possible to respectively obtain at the two outputs 26 and 28 of the coupler 24, the TE and TM modes of an input lightwave arriving at one 30 of the two inputs of the coupler 22.

However, this known splitter has the disadvantage of lacking compactness, its length being approximately 2 cm or more.

SUMMARY OF THE INVENTION

The present invention aims at obviating the aforementioned disadvantages by proposing a polarization splitter, which can be produced with very simply shaped electrodes (e.g. strip-like electrodes) and which can be very compactly manufactured with a length less than 5 mm.

More specifically, the present invention relates to a polarization beam splitter for guided light, which comprises a directional coupler having an alternating delta beta electrode structure, said coupler incorporating two sections adjacent to one another and two light guides, one end of one of the two guides serving to receive an input lightwave, which is a combination of the two optical guided modes, namely a transverse-electrical mode TE and a transverse-magnetic mode TM, characterized in that the coupler is produced on a substrate made from a material having a refractive index associated with the TE mode and a refractive index associated with the TM mode and which makes it possible to induce opposite variations respectively on the refractive indexes and in that the coupler is able to introduce, in the absence of a voltage between the electrodes, a delta beta variation between the propagation constants respectively corresponding to the symmetrical and antisymmetrical propagation modes of the coupler, which is on the one hand independent of the polarization state of the lightwave guided by the splitter and on the other is such that the representative point of the coupler on its control diagram is the centre of a segment parallel to the abscissa axis of the reference frame in which the diagram is plotted and which is defined by two points respectively belonging to a curve corresponding to crossed states of the coupler and to a curve corresponding to parallel states of said coupler, so that for an appropriate electrical polarization of the latter, one of the two TE and TM modes of the input lightwave is obtained at the other end of the guide, which receives said input lightwave and the other mode at the corresponding end of the other guide.

According to a special embodiment of the splitter according to the invention, the respective widths of the guides respectively undergo an increase and a decrease in one of the two sections of the coupler and respectively a decrease identical to the precedent and an increase identical to the precedent in the other section, the increases and decreases being chosen so as to obtain said representative point of the coupler.

The splitter according to the invention can be provided with control means making it possible to switch the TM and TE modes respectively obtained at the corresponding ends of the coupler.

The variations of the refractive indexes respectively associated with the TE mode and the TM mode can be induced by an electrooptical effect.

According to a special embodiment of the splitter according to the invention, the material of the substrate is chosen from among the materials belonging to the 3 m trigonal crystal symmetry group, the material of the substrate thus being a uniaxial electrooptical material having three crystal axes X, Y and Z perpendicular to one another, the X and Y axes corresponding to the ordinary index No. of the material, whilst the Z axis corresponds to the extraordinary index Ne of said material, the face of the substrate on which the splitter is formed is perpendicular to one of the X and Y axes and the splitter is formed in such a way that the guided light propagates parallel to the Z axis in said splitter.

LiNbO$_3$ can be chosen from the group indicated hereinbefore. Thus, a X-cut or Y-cut, Z-propagating LiNbO splitter is obtained, cf. document (7).

Such a configuration makes it possible to obtain a significant reduction of the modal birefringence and simplifies the design of the electrodes of the splitter compared with X-propagating or Y-propagating configurations.

In this case, the coupler can be produced by local diffusion of Ti, ion exchange or implantation in LiNbO$_3$. The ratio of the interaction length L to the coupling length lc of the coupler can be equal to or greater than 1 and equal to or less than 3.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 4:
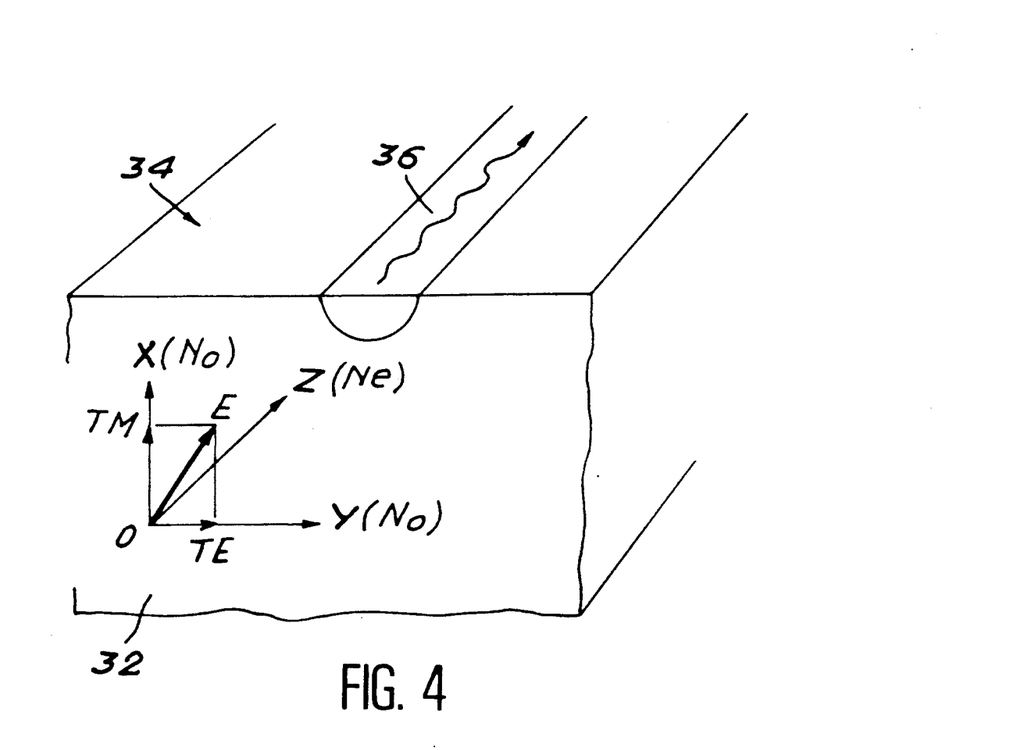
FIG. 4: A diagrammatic sectional view of a substrate made from a material usable in the present invention.

FIG. 4 is a diagrammatic sectional view of a substrate 3 made from a uniaxial electrooptical material on which it is possible to produce a splitter according to the present invention. This material has three crystal axes X, Y and Z. Each of these axes is perpendicular to the two others.

Moreover, each of the axes X and Y corresponds to the ordinary index No of the material, whilst the Z axis corresponds to the extraordinary index Ne of said material.

The face 34 of the substrate 32 on which the splitter is produced is perpendicular either to the X axis or to the Y axis. In the case of FIG. 4, the splitter is produced on a face perpendicular to the X axis.

FIG. 4 shows a part 36 of a waveguide incorporating the splitter and which is produced by localized diffusion of an appropriate material, by ion exchange or by implantation in the substrate 32.

The electrical field E of a lightwave arriving in the splitter is conventionally considered to be the sum of the two modes TE and TM perpendicular to one another and perpendicular to the lightwave propagation direction which, in the present case, is parallel to the Z axis.

Moreover, it is known that the TE mode is parallel to the substrate face 34, whilst the TM mode is perpendicular to said face 34. Thus, in the case where the face 34 is perpendicular to the axis X (FIG. 4), the TE mode is on the Y axis and the TM mode on the X axis.

Obviously, in the case where the substrate face on which the splitter is produced is perpendicular to the Y axis, the TE mode will be on the X axis and the TM mode on the Y axis.

Figure 5:
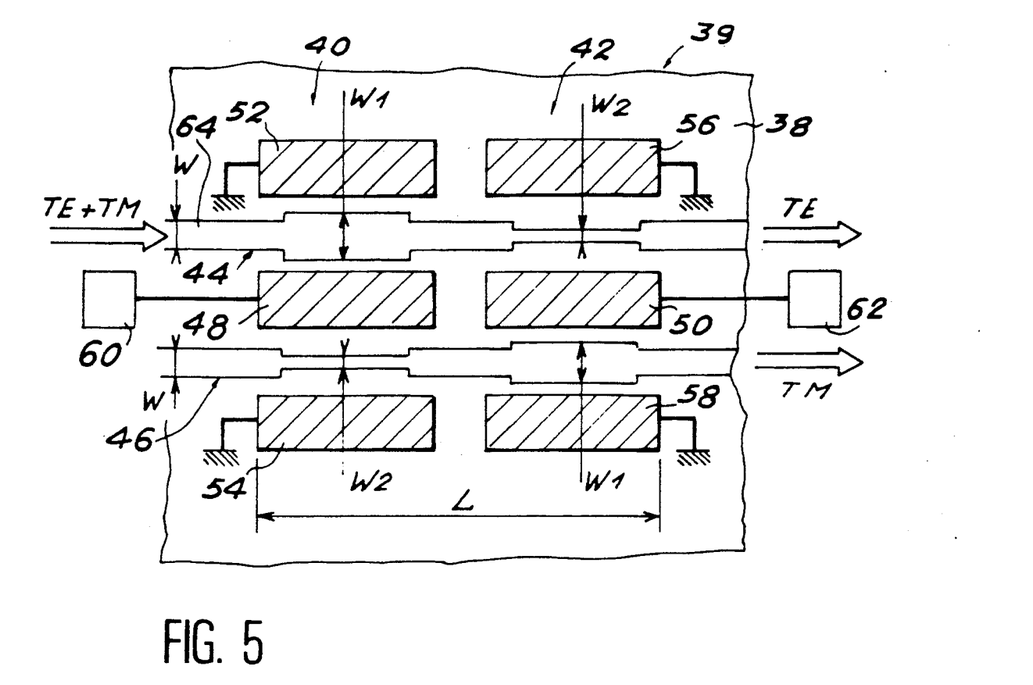
FIG. 5: A diagrammatic plan view of an embodiment of the polarization splitter according to the invention, which comprises an alternating delta beta directional coupler.

FIG. 5 diagrammatically shows in plan view an embodiment of the splitter according to the invention. The latter is diagrammatically shown in FIG. 5 and is produced from a X-cut, Z-propagating LiNbO₃ substrate 38 and comprises an alternating delta beta structure directional coupler.

In conventional manner, this coupler comprises two adjacent sections 40, 42 and two substantially parallel light guides 44, 46, which successively traverse the two sections and which are sufficiently close together to permit a mutual optical coupling.

The coupler according to FIG. 5 is provided with electrodes, whose polarization makes it apply to the two guides in each section, electrical fields which are opposed to one another and such that for each guide, the fields respectively applied thereto in the two sections are opposed to one another.

In the embodiment shown in FIG. 5, the section 40 (respectively 42) has an electrode 48 (respectively 50) between the guides 44, 46 and two electrodes 52, 54 (respectively 56, 58) on either side of the assembly of the two guides.

In plan view, the electrodes 52 and 56 form simple aligned strips and this also applies with respect to the electrodes 48, 50 and the electrodes 54, 58.

Control means 60, 62 are provided for raising the electrodes 48, 50 respectively to opposite electrical potentials +V and −V, the other electrodes 52, 54, 56 and 58 being grounded or earthed.

In a not shown variant, control means are provided for raising the electrodes 52, 54 to an electrical potential −V and in the electrodes 56, 58 to an opposite electrical potential +V, the electrodes 48 and 50 then being grounded.

Moreover, two aligned electrodes, which must be grounded, can obviously be replaced by a single grounded electrode and occupying the surface occupied by these two electrodes, as well as the space between them.

Figure 6:
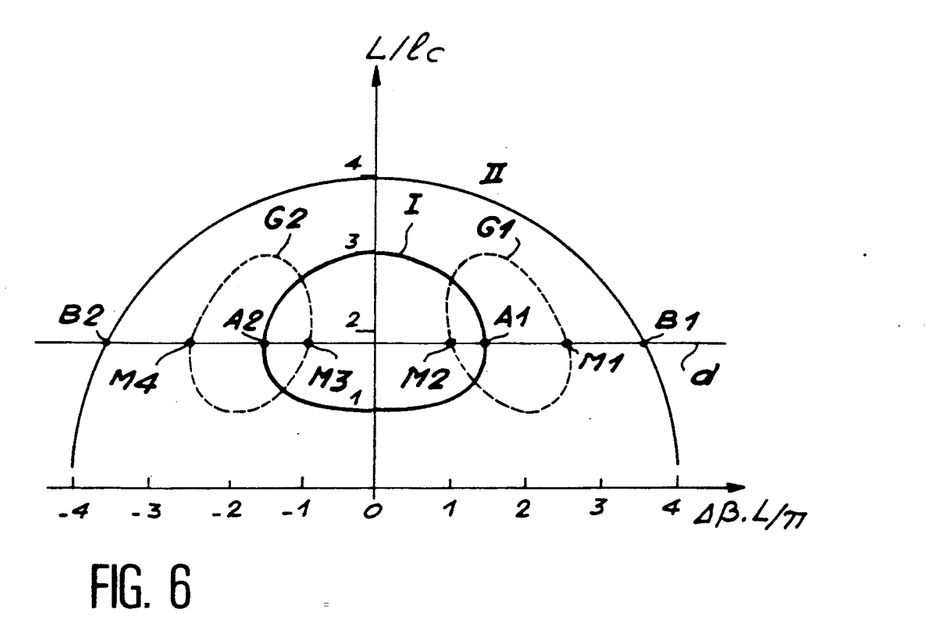
FIG. 6: Part of the control diagram of said coupler.

FIG. 6 is the control diagram of the coupler of FIG. 5, in which the crossed states of the coupler form a plurality of closed curves such as I admitting the ordinate axis as the axis of symmetry. The parallel states of the coupler form semicircles such as II.

The alternating delta beta coupler of FIG. 5 differs from known alternating delta beta couplers by the fact that the guides 44 and 46 do not have a constant width W. For one of the guides the said width is increased in the first section and decreased in the second section, whilst the width of the other guide is decreased in the first section and increased in the second section, the decreases being identical and the increases also being identical.

Thus, FIG. 5 shows that the width of the guide 44 (respectively 46) assumes a value W1 greater than W (respectively a value W2 smaller than W) in the section 40 and the value W2 (respectively W1) in the section 42.

These width variations obtained with the aid of appropriate masks during the manufacture of the coupler, mean that the coupler of FIG. 5 has a "passive prepolarization". In the absence of a voltage applied between the electrodes, the representative point of the coupler in the diagram of FIG. 6, is not located on the ordinate axis (where delta beta is zero), contrary to what would occur if the guides 44 and 46 had a constant width W.

It will be assumed that this representative point is located at M1 in the first quadrant of the reference frame of FIG. 6, on a segment parallel to the abscissa axis and defined by the points A1 and B1 respectively belonging to the curves I (crossed states) and II (parallel states).

The application to the coupler of the voltages +V and −V, referred to hereinbefore, leads to a displacement of the representative point of the coupler parallel to the abscissa axis of the reference frame, on the straight line d passing through the points A1 and B1. It is therefore possible to obtain a parallel state or a crossed state for one of the TE and TM modes of a lightwave fed into one of the guides and namely through one end thereof. For example, a crossed state (point A1) can be reached for the TE mode.

The application of an electric field to the Z-propagating splitter of FIG. 5 leads to delta beta variations (TE) and opposite delta beta (TM) variations for the TE and TM modes.

In the above example, the representative point B1 of the TM mode will consequently be a symmetrical point of point A1 with respect to point M1.

If point A1 is located on the curve I (crossed states), it is necessary, in order to obtain a spatial splitting of the polarized waves TE and TM, for B1 to be located on curve II (parallel states). This can only be obtained if the point M1 is the centre of the segment A1B1. Thus, there is a separation of the TE and TM modes.

For example, if the lightwave (TE+TM) is fed into the guide 44 by its end 64, located on the side of the section 40, it is possible to obtain, by appropriate electrical polarization of the coupler, the TE mode at the other end of the guide 44 and the TM mode at the end of the guide 46 located on the side of the section 42.

It is pointed out in this connection that the lightwave can originate from a not shown optical fibre and can be injected into the end 64 of the guide 44 via an appropriate optics, or can originate from a not shown waveguide, produced on the same face of the substrate as the splitter and which is extended by the guide 44.

On returning to the diagram of FIG. 6, it is pointed out that all the points located mid-distance of the curves I and II and proving the condition $$1 \leq L/lc \leq 3 \tag{1}$$

is constituted by two closed curves G1 and G2 and which are symmetrical to one another with respect to the ordinate axis.

Each point of these curves G1 and G2 is a passive prepolarization point.

For a given ratio L/lc, which proves the condition (1), there are in general four prepolarization points of the coupler making it possible to bring about mode splitting (or polarization splitting).

For example, for the ratio L/lc corresponding to the line d, there are four points M1, M2, M3 and M4, as can be seen in FIG. 6 and it is possible to write:

$$M1A1 = M1B1, \quad M2A2 = M2B1$$

$$M3A1 = M3B2 \text{ and } M4A2 = M4B2.$$

Preferably one of the points M1 and M4 is chosen as the prepolarization point, because said points M1 and M4 require a delta beta excursion and therefore voltages applied to the coupler which are lower in absolute value to those required by points M1 and M3.

It is also pointed out that other prepolarization points are possible due to the fact that the diagram of FIG. 6 has other not shown curves corresponding to parallel states on the one hand and crossed states on the other (cf. FIG. 2).

In general terms, the prepolarization points are located in the ranges defined by the condition:

$$4k + 1 \leq L/lc \leq 4k + 3$$

in which k is a positive integer or zero.

However, it is not generally advantageous to work with a high L/lc ratio. Therefore preference is given to prepolarization points in the range corresponding to k equals 0.

In order to produce a polarization splitter of the type described relative to FIG. 5, use is made of the control diagram from which it is possible to plot the prepolarization curves such as G1 and G2.

The ratio L/lc is chosen giving a prepolarization point, e.g. M1 and from it is deduced the delta beta passive prepolarization to be obtained, after choosing L. This passive prepolarization can be connected empirically or by modeling with the widths W1 and W2 of the guides and their respective index profiles.

Thus, it is possible to determine the various parameters of the splitter.

It should be noted that the splitter according to the invention can operate as a polarization switching means.

Taking as an example the splitter of FIG. 5, for this purpose it is merely necessary to provide means 60 and 62 able to reverse the voltages which they respectively apply to the electrodes 48 and 50, which gives the possibility of switching the TE and TM polarizations between the two output ends of the coupler of FIG. 5.

Materials other tha LiNbO$_3$ can be used in the present invention, e.g. X-cut, Z-propagating LiTaO$_3$ material.

Moreover, in the present invention, instead of using LiNbO$_3$ or LiTaO$_3$ in X-cut and Z-propagating manner, said material can be used in Y-cut, Z-propagating manner.

In both cases, it is necessary for the electrical field e.g. applied to the guides g1, g2 of the splitter produced on said material (FIGS. 7 and 8) to be directed in accordance with the Y axis.

In the case of a X-cut, the electrodes of the splitter, such as electrodes e1, e2 and e3 (FIG. 7), must therefore permit the application of an electric field parallel to the surface of the material on which the splitter is produced.

Figure 7:
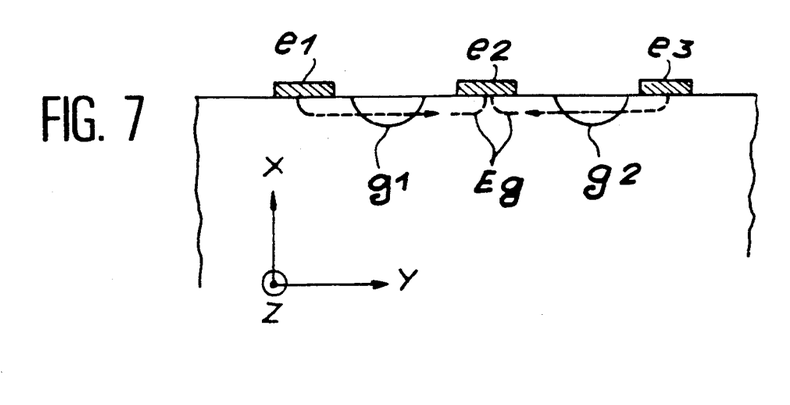
FIG. 7: Diagrammatically the possibility of producing a splitter according to the invention on a X-cut, Z-propagating LiNbO$_3$-type material.

FIG. 7 shows that the electrodes e1, e2 and e3 can be placed on the surface of the material on either side of the guides g1 and g2.

In the case of a Y-cut, the splitter electrodes such as e'1, e'2 and e'3 (FIG. 8) must permit the application of an electric field Eg perpendicular to the surface of the material on which the splitter is produced.

Figure 8:
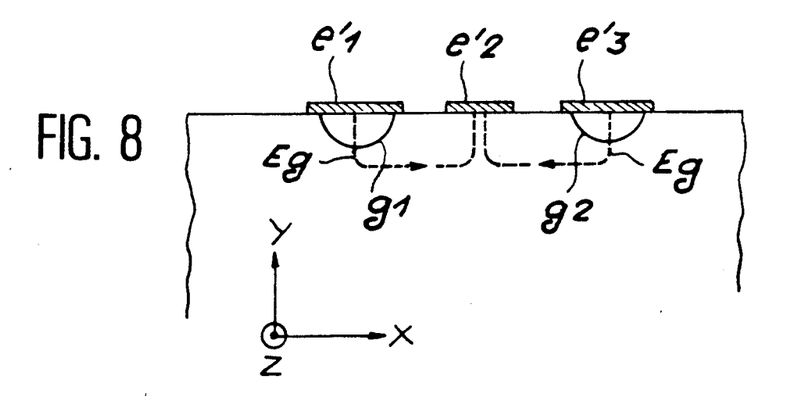
FIG. 8: Diagrammatically the possibility of producing a splitter according to the invention on a Y-cut, Z-propagating LiNbO$_3$-type material.

FIG. 8 shows that these electrodes e'1, e'2 and e'3 can be placed on the surface of the material, the electrodes e'1 and e'3 being on the guides g1 and g2 and the electrode e'2 between these guides.

Finally, it is possible to use within the scope of the invention materials other than those belonging to the LiNbO$_3$ family.

A splitter according to the invention can be produced on a substrate made from any material making it possible to induce opposite variations DN and $-$DN respectively on the refractive index associated with the TE mode and on the refractive index associated with the TM mode (these TE and TM modes corresponding to the lightwave reaching the splitter input).

Thus, it is possible to use gallium arsenide (GaAs), which is a semiconductor forming part of the cubic 43 m crystal symmetry group.

Figure 9:
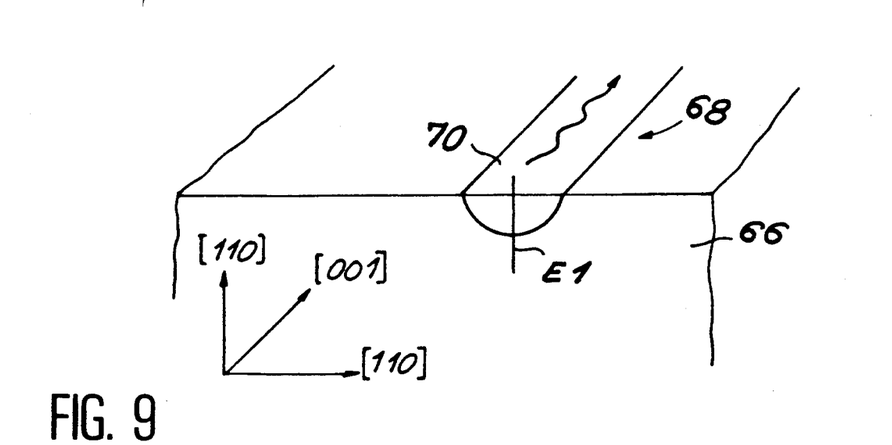
FIG. 9: A diagrammatic sectional view of a substrate made from another material usable within the scope of the invention.

For example, use is made of a GaAs substrate 66 (FIG. 9), the face 68 of said substrate on which is produced the splitter, whereof part 70 is shown in FIG. 9, is perpendicular to the crystal axis $|\overline{1}10|$, each electric field E1 necessary for the operation of the splitter being applied in accordance with the axis $|110|$ and therefore perpendicular to the substrate, the propagation direction of the guided light being parallel to the axis $|001|$.

Under these conditions, the TM mode is polarized in accordance with the axis $|110|$ and the TE mode in accordance with the axis $|110|$.

In this example, the refractive indexes $N_{TE}$ and $N_{TM}$ respectively associated with the TE and TM mode have as expressions:

$$N_{TE} = n_0 - \tfrac{1}{2} . n_0^3 . r_{41} . |E1|$$

$$N_{TM} = n_0 + \tfrac{1}{2} . n_0^3 . r_{41} . |E1|$$

in which |E1| represents the modulus of E1, $r_{41}$ represents the single non-zero coefficient of the electrooptical tensor of GaAs and $n_0$ represents the value common to $N_{TE}$ and $N_{TM}$ in the absence of the field E1.

It should be noted that the variations of $N_{TE}$ and $N_{TM}$, induced by the electrooptical effect, are opposite.

CITATIONS (1) GRANESTRAND, THYLEN, STOLTZ, Electron. Lett., 24, No. 18, 1142 (1988), "Polarization independent switch and polarization splitter employing delta beta and delta kappa modulation"

(2) PAPUCHON, ROY, OSTROWSKY, Appl. Phys. Lett., 31, 266 (1977), "Electrically active optical bifurcation: BOA"

(3) FINAK, YIP, Opt. Quant. El., 17, 15 (1985)

(4) FUJII, HIDAKA, Proc. 4th IOOC, TOKYO, (1983) 29A1-4, "LiNbO$_3$ optical waveguide fabricated by the ion-exchange technique and its application to TE/TM mode splitter"

(5) K. HABARA, Electron. Lett., vol. 23, No. 12, Jun. 4, 1987, p 614, "Lithium niobate directional coupler polarization splitter"

(6) CHUNG, CHIANG, Optics and Lasers Technology, April 1983, p 83 to 90

(7) BOURBIN, ENARD, WERNER, VATOUX, PAPUCHON, 5th International Conference on Integrated Optics, ECIO'89, "A polarization splitter in integrated optics".

I claim:

1. Polarization beam splitter for guided light, which comprises a directional coupler (39) having an alternating delta beta electrode structure, said coupler incorporating two sections (40, 42) adjacent to one another and two light guides (44, 46), one end (64) of one (44) of the two guides serving to receive an input lightwave, which is a combination of the two optical guided modes, namely a transverse-electrical mode TE and a transverse-magnetic mode TM, characterized in that the coupler is produced on a substrate (38) made from a material having a refractive index associated with the TE mode and a refractive index associated with the TM mode and which makes it possible to induce opposite variations respectively on the refractive indexes and in that the coupler is able to introduce, in the absence of a voltage between the electrodes, a delta beta variation between the propagation constants respectively corresponding to the symmetrical and anti-symmetrical propagation modes of the coupler, which is on the one hand independent of the polarization state of the lightwave guided by the splitter and on the other is such that the representative point of the coupler (M1, M2, M3, M4) on its control diagram is the centre of a segment parallel to the abscissa axis of the reference frame in which the diagram is plotted and which is defined by two points (A1, B1; A2, B1; A1, B2; A2, B2) respectively belonging to a curve (I) corresponding to crossed states of the coupler and to a curve (II) corresponding to parallel states of said coupler, so that for an appropriate electrical polarization of the latter, one of the two TE and TM modes of the input lightwave is obtained at the other end of the guide (44), which receives said input lightwave and the other mode at the corresponding end of the other guide.

2. Splitter according to claim 1, characterized in that the respective widths of the guides (44, 46) respectively undergo an increase and a decrease in one (40) of the two sections of the coupler and respectively a decrease identical to the precedent and an increase identical to the precedent in the other section (42), the increases and decreases being chosen so as to obtain said representative point of the coupler.

3. Splitter according to claim 1, characterized in that it is provided with control means (60, 62) making it possible to switch the TM and TE modes respectively obtained at the corresponding ends of the coupler.

4. Splitter according to claim 1, characterized in that the refractive index variations are induced by an electrooptical effect.

5. Splitter according to claim 4, characterized in that the material of the substrate (38) is chosen from among the materials belonging to the 3 m trigonal crystal symmetry group, the material of the substrate thus being a uniaxial electrooptical material having three crystal axes X, Y and Z perpendicular to one another, the X and Y axes corresponding to the ordinary index No of the material, whilst the Z axis corresponds to the extraordinary index Ne of said material, the face of the substrate on which the splitter is formed is perpendicular to one of the X and Y axes and the splitter is formed in such a way that the guided light propagates parallel to the Z axis in said splitter.

6. Splitter according to claim 5, characterized in that the material of the substrate (38) is LiNbO.

7. Splitter according to claim 6, characterized in that the coupler (39) is produced by local diffusion of Ti, ion exchange or implantation in LiNbO.

8. Splitter according to claim 7, characterized in that the ratio of the interaction length L to the coupling length lc of the coupler (39) is equal to or greater than 1 and equal to or lower than 3.

* * * * *

UNITED STATES PATENT AND TRADEMARK OFFICE
CERTIFICATE OF CORRECTION

PATENT NO. : 5,151,957
DATED : September 29, 1992
INVENTOR(S) : Luc Riviere

It is certified that error appears in the above-identified patent and that said Letters Patent is hereby corrected as shown below:

Column 1, line 10, delete "monamode" and insert --monomode--; and line 12, delete "perameter" and insert --parameter--.

Column 7, line 35, delete "tha" and insert --than--.

Column 8, line 15, delete "|110|" and insert --|$\overline{1}10$|--.

Column 8, line 21, delete "$N_{TE}=n_0-\frac{1}{2}.n_{03}.r_{41}.|E1|$" and insert --$N_{TE}=n_0-\frac{1}{2}.n_0^3.r_{41}.|E1|$--; and line 23, delete "$N_{TM}=n_0+\frac{1}{2}.n_0^3.r_{41}.|E1|$" and insert --$N_{TM}=n_0+\frac{1}{2}.n_0^3.r_{41}.|E1|$--.

Column 10, line 10, delete "3 m" and insert --3m--.

Signed and Sealed this

Twenty-sixth Day of October, 1993

Attest:

BRUCE LEHMAN

Attesting Officer

Commissioner of Patents and Trademarks